United States Patent
Marcos Montes et al.

(10) Patent No.: US 9,429,459 B2
(45) Date of Patent: Aug. 30, 2016

(54) SYSTEM AND METHOD FOR MEASURING A MASS OF FUEL WITHIN A VARIABLE GEOMETRY CONTAINER

(71) Applicant: EADS Construcciones Aeronauticas, S.A., Madrid (ES)

(72) Inventors: Jose Luis Marcos Montes, Getafe (ES); Guillaume Angibaud, Getafe (ES); Samuel De La Fuente Lopez, Getafe (ES); Martin Espinosa Sanchez, Getafe (ES)

(73) Assignee: EADS Construcciones Aeronautics S.A., Madrid (ES)

( * ) Notice: Subject to any disclaimer, the term of this patent is extended or adjusted under 35 U.S.C. 154(b) by 137 days.

(21) Appl. No.: 14/524,794

(22) Filed: Oct. 27, 2014

(65) Prior Publication Data

US 2015/0114103 A1   Apr. 30, 2015

(30) Foreign Application Priority Data

Oct. 28, 2013  (EP) .................................... 13382429

(51) Int. Cl.
*G01F 23/00* (2006.01)
*G01F 22/00* (2006.01)
*G01F 23/20* (2006.01)

(52) U.S. Cl.
CPC ........... *G01F 23/0061* (2013.01); *G01F 22/00* (2013.01); *G01F 23/20* (2013.01)

(58) Field of Classification Search
None
See application file for complete search history.

(56) References Cited

U.S. PATENT DOCUMENTS

| | | | |
|---|---|---|---|
| 5,133,212 A | 7/1992 | Grills et al. | |
| 5,386,736 A * | 2/1995 | Spillman, Jr. | ........ G01F 23/0076 73/149 |
| 6,434,494 B1 | 8/2002 | Forsythe, Jr. | |
| 6,700,503 B2 * | 3/2004 | Masar | ................... G01F 15/063 340/870.01 |
| 7,415,364 B2 * | 8/2008 | Mazrooee | ............. B28C 7/0418 324/306 |

FOREIGN PATENT DOCUMENTS

| | | |
|---|---|---|
| DE | 102010045652 | 3/2012 |
| FR | 2976071 | 12/2012 |

OTHER PUBLICATIONS

European Search Report, Feb. 11, 2014.

* cited by examiner

*Primary Examiner* — Peter Macchiarolo
*Assistant Examiner* — Jermaine Jenkins
(74) *Attorney, Agent, or Firm* — Greer, Burns & Crain Ltd.

(57) ABSTRACT

A system and method for measuring a mass of fuel contained in a variable geometry container. The container comprises a container assembly, formed by a variable geometry container disposed on a rigid support, a three-axis load cell coupled with the rigid support and providing a first set of three signals with a magnitude proportional to the force exerted by the container assembly, a three-axis accelerometer coupled with the rigid support and providing a second set of three signals with a magnitude proportional to the acceleration to which the container assembly is subjected, and a signal processing device configured to convert the first and the second set of signals into force and acceleration data, for three perpendicular directions of the space, and configured to calculate a measure relative to the mass of fuel contained in the variable geometry container.

13 Claims, 2 Drawing Sheets

SYSTEM AND METHOD FOR MEASURING A MASS OF FUEL WITHIN A VARIABLE GEOMETRY CONTAINER

CROSS-REFERENCES TO RELATED APPLICATIONS

This application claims the benefit of the European patent application No. 13382429.2 filed on Oct. 28, 2013, the entire disclosures of which are incorporated herein by way of reference.

BACKGROUND OF THE INVENTION

The present invention refers to a system for measuring the mass of fuel contained in a variable geometry container, and more specifically, to a system and method for measuring the mass of fuel contained in a portable container, particularly susceptible of being subject to external forces when it is embodied in an aircraft.

The measurement and indication to the crew of fuel quantity or fuel volume contained in a fuel container is a mandatory requirement in the aerospace field. Indeed, the fuel quantity present in the fuel container is a critical parameter that must be known at any time, as the fuel distribution in the aircraft affects directly, and in an important way, the distribution of center of gravity of the aircraft. Likewise, the remaining fuel is of major importance for managing the engine consumption and for Air-to-Air Refueling purposes, as being directly based on that parameter.

There are known several systems for measuring the mass of fuel within a container. In airplanes, the level gauge type sensors have been implemented for years. Such sensors are based on the measurement of the capacitance of a liquid, and although these systems are largely used nowadays, they are restricted to rigid containers only, as the volume and geometry of the container must be known at any time.

Alternatively to the level gauge type sensors, the use of load cell type systems is also known for fuel measurement purposes, also for being used in external containers embodied in an aircraft.

Regarding this, the document U.S. Pat. No. 5,133,212A discloses to determine the volume of a liquid contained in a tank submitted to external forces by means of one-axis load cells. However, the disclosure requires the fuel tank to only have one degree of freedom, being necessarily rigid in two of the three directions of the space. Therefore, the disclosure requires physically blocking the movement of the tank along two directions, entailing the need to fix it to the aircraft structure. Additionally, the document describes the need of a reference load cell to be used to determine the attitude of the aircraft.

Also, the document FR2976071A1 describes a system for measuring the liquid contained in a tank submitted to external forces by means of one-axis load cells. As the above mentioned document, the invention requires the use of gyroscopes and accelerometers to determine the attitude of the aircraft. Likewise, the French application requires the fuel tanks to be rigid-type tanks with one degree of freedom, newly, requiring physically blocking the movement of the tank along two directions and fixing it to the aircraft structure.

Thus, known systems for measuring the mass of fuel within a container requires the use of rigid-type containers with a unique degree of freedom, preferably along the yaw axis. This requirement entails the need to restrain or prevent movement in the two other directions, usually roll and pitch, which is not possible for a variable geometry container.

Therefore, there is a need in the aeronautical industry, for a new system and method which is capable of measuring the mass of fuel contained in a variable geometry container, also in the event that the container is non-rigid, such as a bladder, or the container is subjected to external forces when is in an aircraft.

SUMMARY OF THE INVENTION

The present invention overcomes the above mentioned drawbacks by providing a new system and method for measuring the mass of fuel contained in a variable geometry container. The invention achieves the provision of an accurate and reliable measure of the mass of fuel contained in a variable geometry container with three degrees of freedom. Thus, the present invention provides the mass of fuel contained in non-rigid containers, such as an elastomeric or bladder type.

An object of the invention is to provide a new method and system for measuring that provides an accurate and reliable measure of the mass of fuel contained in a variable geometry container, specifically when the container is non-rigid, such as a bladder type.

Another object of the present invention is to simplify the measuring process as avoiding the need for ancillary structures, conventionally required for blocking container movements along determined directions, and for fixing it to the aircraft structure. Also, the invention provides for simplifying the measuring process, avoiding the use of reference elements for the measuring process calculations.

In one aspect of the invention, the system for measuring the mass of fuel contained in a variable geometry container, comprises:

a container assembly formed by a variable geometry container disposed onto a rigid support so that the weight of the container rests on the rigid support, at least one three-axis load cell coupled with the rigid support, wherein the three-axis load cell provides a first set of three signals (SLCx, SLCy, SLCz), each one of the three signals having a magnitude proportional to the force exerted by the container assembly in one of the directions of the three perpendicular directions of the space, at least one three-axis accelerometer coupled with the rigid support, wherein the three-axis accelerometer provides a second set of three signals (SAx, SAy, SAz), each one of the three signals having a magnitude proportional to the acceleration to which the container assembly is subjected in one of the directions of three directions of the space, and a signal processing device configured to convert the first and the second set of signals for obtaining force (Fx, Fy, Fz) and acceleration (Ax, Ay, Az) data, for each one of the directions of the three common directions of the space, and also configured to calculate a measure relative to the mass of fuel contained in the variable geometry container.

The system is applicable for containers that are free of movement in one or more directions of the space, where the movements along other directions of the space do not have to be blocked, which otherwise, is not possible in case of non-rigid or flexible containers, such as elastomeric bladders.

Thus, with the use of variable geometry containers, the system avoids the need for blocking container movements along any direction of the space, and also the need for fixing the container to the aircraft structure in order to block movement thereof. This, as has been already mentioned, is not possible due to the variable geometry of the container.

Without blocking variable geometry container movements, the container will be submitted to forces exerted in the three directions of the space, such as along the pitch axis, the roll axis and the yaw axis. These forces are directly applied to the rigid support of the container assembly, wherein the weight of the variable geometry container rests, and where, consequently, at least one three-ax load cell is coupled. In this way, the forces exerted in the three directions are directly applied to the, at least, one three-axis load cell, which is or are capable of measuring the forces also in the three directions of the space.

Thereby, the at least one three-axis load cell that the system comprises, provides a first set of three signals (SLCx, SLCy, SLCz), wherein each one has a magnitude proportional to the force exerted by the container assembly in one of the directions of three directions of the space. Thus, the system acquires the capacity for measuring magnitudes proportional to the force in the three directions of the space wherein the at least one three-axis load cell is aligned to be sensitive.

As the system also comprises at least one three-axis accelerometer, the system offers, by means of a signal processing device, the capacity for measuring the mass of fuel contained at any time in the variable geometry container.

For that, the signal processing device is configured to convert the first set of three signals (SLCx, SLCy, SLCz) and the second set of signals (SAx, SAy, SAz), for obtaining force (Fx, Fy, Fz) and acceleration (Ax, Ay, Az) data, for each one of the directions of a three common directions of the space. The signal processing device is also configured to calculate a measure relative to the mass of fuel contained in the variable geometry container.

Regarding the three common directions of the space, it has to be noted that both the three-axis load cell and the three-axis accelerometer provide signals for each direction of the three directions of the space according to their local coordinate systems, so the signal processing device is additionally configured to transform the signals from different local coordinate systems into a unique and global coordinate system. So, the three common directions of the space refers to the global coordinate system. However, the transformation may not be required if the three-axis load cell and the three-axis accelerometer are aligned with three common directions of the space, at their installation onto the rigid support.

Thus, the system provides a measure of the mass of fuel contained in the variable geometry container, without requiring blocking container movements or fixing the container to the aircraft structure. Also, the system simplifies the number of elements required for the measuring, avoiding the use of reference elements, such as additional mass conventionally used as a reference, achieving, at the same time, a weight reduction for the system.

Likewise, allowing the variable geometry container to move along the three directions of the space, and comprising, at least, one three-axis load cell and one three-axis accelerometer, the system offers a reliable measure of mass when the container is subjected to external forces, for instance, when is in an aircraft.

In another aspect of the invention, the method for measuring the mass of fuel contained in a variable geometry container, comprises the steps of:

providing a container assembly formed by a variable geometry container disposed onto a rigid support so that the weight of the container rests on the rigid support, generating at least a first set of three signals (SLCx, SLCy, SLCz), by means of a three-axis load cell coupled with the rigid support, wherein each one of the three signals has a magnitude proportional to the force exerted by the container assembly in one of the directions of three directions of the space, generating at least a second set of three signals (SAx, SAy, SAz), by means of a three-axis accelerometer coupled with the rigid support, wherein each one of the three signals has a magnitude proportional to the acceleration to which the container assembly is subjected in one of the directions of three directions of the space, converting the first and the second set of signals into digital data, representative of measured forces (Fx, Fy, Fz) and acceleration (Ax, Ay, Az) subjected by the container assembly, for each one of the directions of a three common directions of the space for the signals, calculating, for each one of the directions of the three common directions of the space, a value relative to the mass of fuel contained in the variable geometry container, from the digital data relative to the measured forces and acceleration, and calculating, a total value relative to the mass of fuel contained in the variable geometry container.

Thus, the method of the invention provides an accurate and reliable measure of the mass of fuel contained in a variable geometry container, with a simplified method due to the need of fewer elements and calculations for the measurement.

BRIEF DESCRIPTION OF THE DRAWINGS

For a better comprehension of the invention, the following drawings are provided for illustrative and non-limiting purposes, wherein.

DETAILED DESCRIPTION OF THE PREFERRED EMBODIMENTS

Figure 1:
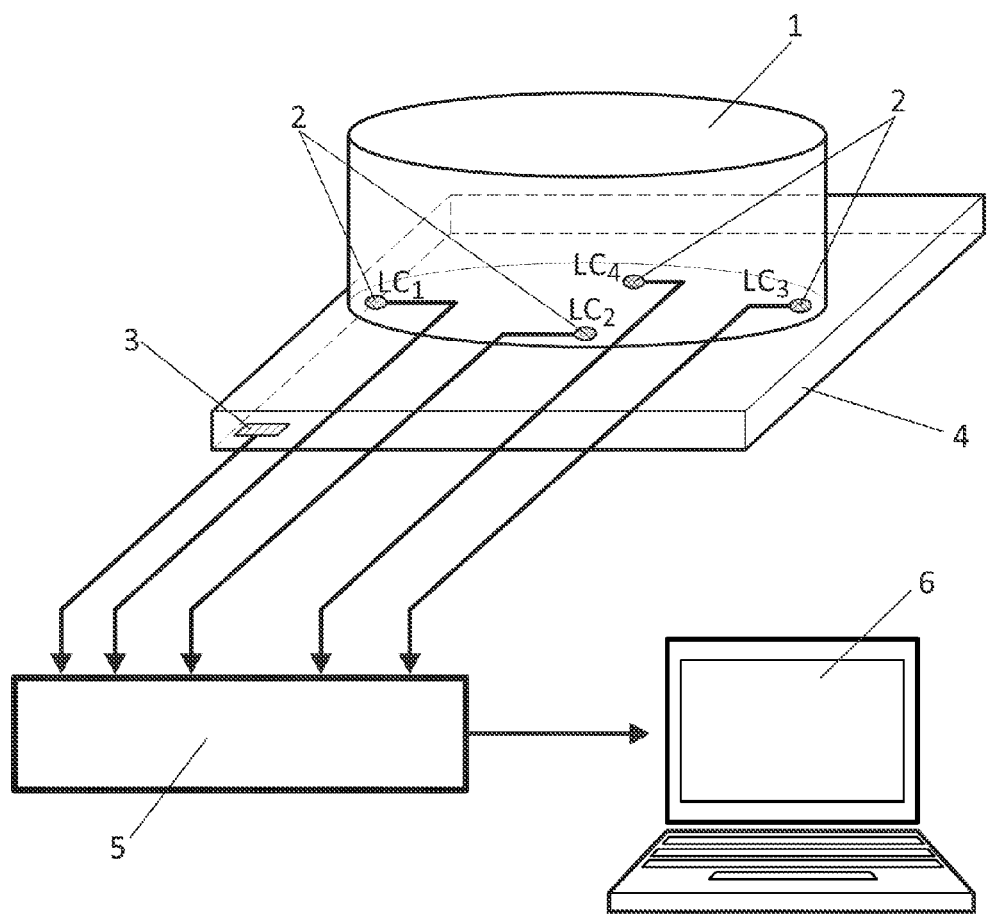
FIG. 1 shows the elements comprised by the system for measuring the mass of fuel contained in a variable geometry container, according to an embodiment of the invention.

FIG. 1 shows a system according to an embodiment of the invention. The figure shows the container assembly, formed by the variable geometry container 1, which is disposed onto the rigid support 4 in such a way that the weight of the container 1 rests on the rigid support 4.

Figure 2:
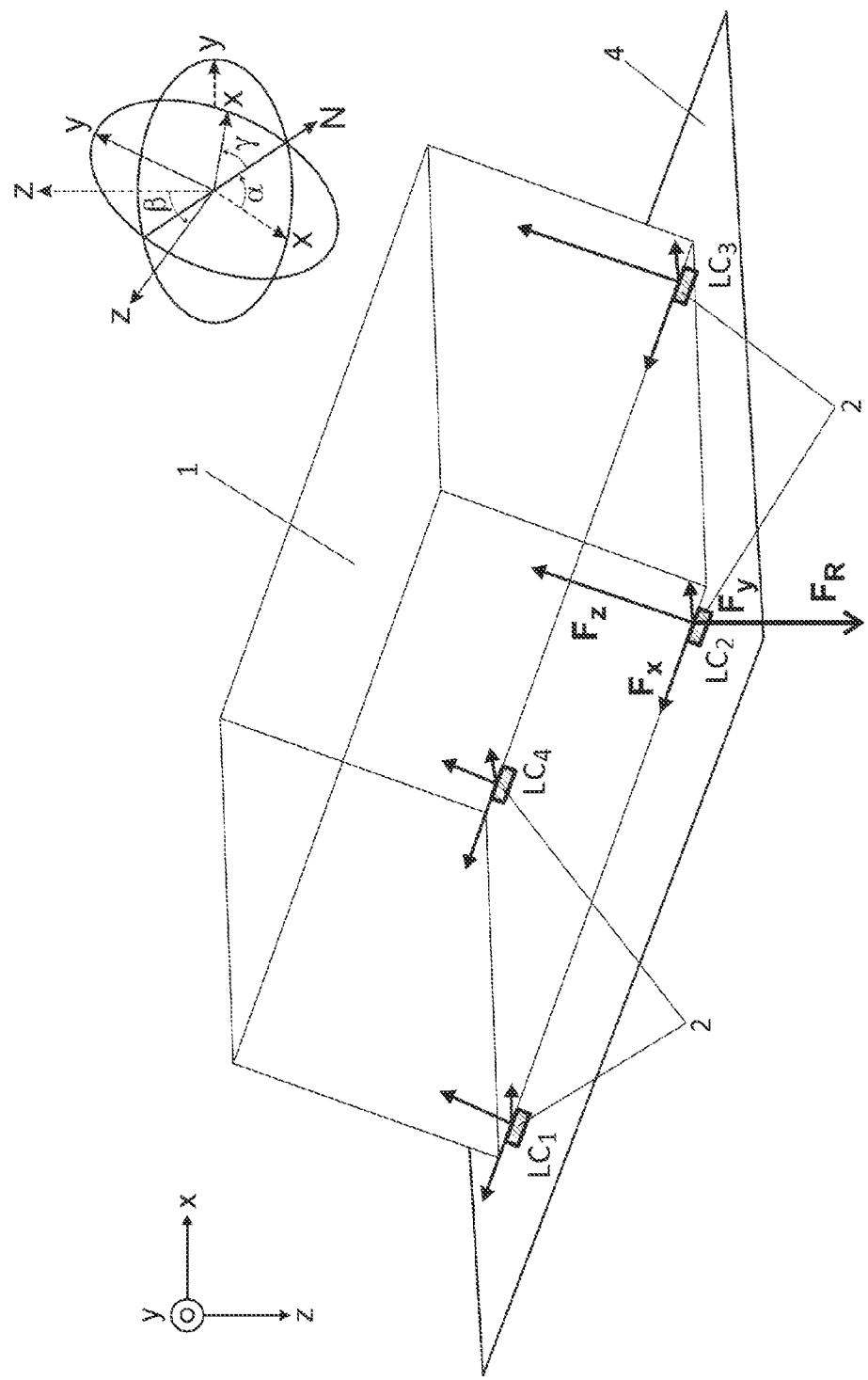
FIG. 2 shows a side elevation view of the variable geometry container, four three-axis load cells coupled with the rigid support wherein the variable geometry container rests, and the three common directions of the space, with respect to which the four three-axis load cells shown are sensitive.

Coupled with the rigid support 4, FIGS. 1 and 2 show, according to another embodiment, four three-axis load cells 2 arranged at opposing extremes of the rigid support 4, wherein each one of the three-axis load cells 2 provides a first set of three signals ($S_{LCx}$, $S_{LCy}$, $S_{LCz}$). Each one of the three signals has a magnitude proportional to the force exerted by the container assembly in one of the directions of three directions of the space.

Additionally, coupled with the rigid support 4, the FIG. 1 shows a three-axis accelerometer 3, wherein the three-axis accelerometer 3 provides a second set of three signals ($S_{Ax}$, $S_{Ay}$, $S_{Az}$). Each one of the three signals has a magnitude proportional to the acceleration to which the container assembly is subjected in one of the directions of three directions of the space.

The weight of the variable geometry container 1 is distributed on four supporting points, which may comprise the three-axis load cells 2 themselves, according to another embodiment. Therefore, each three-axis load cell 2 measures a force (N) composed with the weight of the container assembly and inertial forces such as acceleration. As the variable geometry container 1 generates forces in the three perpendicular directions, each three-axis load cell 2 measures forces in the three directions of the space (x, y, z), depending on the attitude of the aircraft (pitch, roll, yaw). Each force in each direction is converted into an analog signal, for instance voltage or current, by the load cell itself, and transmitted to the signal processing device 5.

The three-axis accelerometer 3 is required to measure the inertial effects (acceleration) in the three directions of the space (x, y, z), and its outputs are transmitted to the signal processing device 5.

Thus, the signal processing device 5 receives one first set of three signals ($S_{LCx}$, $S_{LCy}$, $S_{LCz}$), from each three-axis load cell 2, and the second set of three signals ($S_{Ax}$, $S_{Ay}$, $S_{Az}$) from the three-axis accelerometer 3.

That is, each one of the four three-axis load cells 2 ($LC_1$, $LC_2$, $LC_3$, $LC_4$) provides a first set of three signals ($S_{LCix}$, $S_{LCiy}$, $S_{LCiz}$), where i=1, 2, . . . 4, and the three-axis accelerometer 3 provides the second set of three signals ($S_{Ax}$, $S_{Ay}$, $S_{Az}$). Thus, the signal processing device 5 receives fifteen signals, twelve signals corresponding to the four sets of three signals of each three-axis load cell 2, and three signals from the three-axis accelerometer 3, ($S_{Ax}$, $S_{Ay}$, $S_{Az}$).

According to another embodiment, the signal processing device 5 is configured to convert the first set of signals for each cell (i; i=1, 2, . . . , 4) and the second set of signals for the accelerometer, for obtaining force ($F_{ix}$, $F_{iy}$, $F_{iz}$) and acceleration ($A_x$, $A_y$, $A_z$) data, for each one of the directions of a three common directions of the space (x, y, z). FIG. 2 shows the three common directions of the space, with respect to which the four three-axis load cells 2 are sensitive for measuring.

Finally, the signal processing device 5 is additionally configured to calculate a measure relative to the mass of fuel contained in the variable geometry container 1.

Thus, for the embodiment shown in the figures, from each first set of three signals ($S_{Lcix}$, $S_{LCiy}$, $S_{LCiz}$), where i=1, 2, . . . 4, the signal processing device 5 is configured to obtain a set of force signals ($F_{ix}$, $F_{iy}$, $F_{iz}$) where i=1, 2, . . . 4, for each direction of the three common directions of the space (x, y, z).

Applying the fundamental principle of dynamics for each one of the common directions of the space and considering that the mass of the container assembly is the sum of the measures of the four three-axis load cell 2 measures, a measure (m) relative to the mass of fuel contained in the variable geometry container 1 is then calculated.

$$\sum_{i=1}^{4} m_i = m; \qquad (1)$$

$$\sum_{i=1}^{4} \vec{F_i} = m_i \vec{A_1}; \qquad (2)$$

$$m = \frac{F_{1x} + F_{2x} + F_{3x} + F_{4x}}{A_x} = \qquad (3)$$

$$\frac{F_{1y} + F_{2y} + F_{3y} + F_{4y}}{A_y} = \frac{F_{1z} + F_{2z} + F_{3z} + F_{4z}}{A_z}$$

According to another embodiment, the signal processing device 5 is configured to calculate the mass of fuel (M) as the result of dividing the sum of the forces exerted on a direction of the three common directions of the space, by the acceleration to which the container assembly is subjected by the same direction, and additionally subtracting the known container assembly empty weight (Wo).

$$M = m - Wo \qquad (4)$$

In another embodiment, as shown in FIG. 1, the system comprises a display system 6 configured to display and monitor the mass of fuel calculated. As shown, the display system 6 is in communicating with the signal processing device 5.

In another embodiment, the signal processing device 5 comprises an analog to digital converter for converting the first and the second set of signals to force ($F_x$, $F_y$, $F_z$) and acceleration ($A_x$, $A_y$, $A_z$) data.

Preferentially, the rigid support 4 is a pallet. The pallet refers to a flat structure suitable for serving as support for the container assembly and for being lifted, in order to facilitate the transportation of the container assembly.

In another embodiment, the three-axis load cell 2 is a strain gauge load cell and is configured to provide analog voltage signals corresponding to the first set of three signals ($S_{LCx}$, $S_{LCy}$, $S_{LCz}$).

In another embodiment, the variable geometry container 1 is a portable container, and it is made of a flexible material. Such portable container refers to the so-called in aviation "drop tanks" or "external tanks", for referring to auxiliary fuel containers externally carried by aircrafts.

Preferentially, the signal processing device is a computer, a digital signal processor, an integrated circuit specific application, a microprocessor, a microcontroller or any other form of programmable hardware, and its configuration is a computer program comprising computer program code adapted to perform the operations described above when the program runs on the signal processing device.

Another aspect of the invention refers to a method for measuring the mass of fuel contained in a variable geometry container, wherein the method comprises the steps of:

providing a container assembly formed by a variable geometry container 1 disposed onto a rigid support 4 so that the weight of the container 1 rests on the rigid support 4, generating at least a first set of three signals ($S_{LCx}$, $S_{LCy}$, $S_{LCz}$), by means of a three-axis load cell 2 coupled with the rigid support 4, wherein each one of the three signals has a magnitude proportional to the force exerted by the container assembly in one of the directions of three perpendicular directions of the space, generating at least a second set of three signals ($S_{Ax}$, $S_{Ay}$, $S_{Az}$), by means of a three-axis accelerometer 3 coupled with the rigid support 4, wherein each one of the three signals has a magnitude proportional to the acceleration to which the container assembly is subjected in one of the directions of the three directions of the space, converting the first and the second set of signals into digital data, representative of measured forces ($F_x$, $F_y$, $F_z$) and acceleration ($A_x$, $A_y$, $A_z$) subjected by the container assembly, for each one of the directions of a three common directions of the space for the signals, calculating, for each one of the directions of the three common directions of the space, a value relative to the mass of fuel contained in the variable geometry container 1, from the digital data relative to the measured forces and acceleration, calculating, a total value relative to the mass of fuel contained in the variable geometry container 1.

According to another embodiment, the step of calculating the value relative to the mass of fuel contained in the variable geometry container 1 consists of dividing the sum of the measured forces exerted on a direction of the three common directions of the space, by the acceleration to which the container assembly is subjected by the same direction.

So, for the embodiment shown in FIGS. 1 and 2, the value relative to the mass of fuel (m) contained in the variable geometry container 1, is calculated as following:

$$m = \frac{F_{1x} + F_{2x} + F_{3x} + F_{4x}}{A_x} \quad (5.1)$$

$$m = \frac{F_{1y} + F_{2y} + F_{3y} + F_{4y}}{A_y} \quad (5.2)$$

$$m = \frac{F_{1z} + F_{2z} + F_{3z} + F_{4z}}{A_z} \quad (5.3)$$

According to another embodiment, the step of calculating the total value relative to the mass of fuel contained in the variable geometry container 1 comprises the step of determining the global mass of fuel ($\overline{m}$) as a result of a function that relates all the calculated values relatives to the mass of fuel contained in the variable geometry container 1 for each direction of the three common directions of the space (x, y, z), and the step of subtracting the known container assembly empty weight to the global mass (Wo).

Likewise, for the embodiment shown in FIGS. 1 and 2, the total value (M) relative to the mass of fuel contained in the variable geometry container 1, is calculated as following:

$$M = \overline{m} - Wo \quad (6)$$

Preferentially, the function that relates all the calculated values relatives to the mass of fuel contained in the variable geometry container 1 for each direction of the three common directions of the space, consists of an arithmetic mean, or a median, or a weighting function.

So, preferentially, for the embodiment shown in FIGS. 1 and 2, $\overline{m}$ may be equal to the arithmetic mean for the m values obtained in the equations number 5.1, 5.2 and 5.3.

In the equations 5.1, 5.2 and 5.3, the values relative to the mass of fuel (m) contained in the variable geometry container 1 in each one of the directions of the three common directions of the space (x, y, z), are substantially equal, with the exception of the case in which the result of forces are applied in a plan, which is parallel to the plan formed by two directions of the three common directions of the space (x, y, z). For instance, this would be the case when the variable geometry container 1 were in a horizontal position (then all the force applied in the x axis, with $F_x = F_y = 0$), and is not subjected to any acceleration in the z axis ($A_y = A_z = 0$), resulting consequently indeterminate equations 5.2 and 5.3. So, in such a case, one or two of the equations 5.1-5.3 are mathematically undetermined and the third needs to be used.

Apart from this exception and in order to provide a more reliable measurement method, the method comprises an additional step of calculation for discarding errors and/or failures.

According to another embodiment, the method further comprises the step of displaying and monitoring the total value relative to the mass of fuel contained in the variable geometry container 1 measured by a display system 6.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for measuring a mass of fuel contained in a variable geometry container, comprising:
    a container assembly formed by a variable geometry container disposed on a rigid support so that a weight of the container rests on the rigid support,
    at least one three-axis load cell coupled with the rigid support, wherein the three-axis load cell provides a first set of three signals, each one of the three signals having a magnitude proportional to the force exerted by the container assembly in one of three perpendicular directions of the space,
    at least one three-axis accelerometer coupled with the rigid support, wherein the three-axis accelerometer provides a second set of three signals, each one of the three signals having a magnitude proportional to the acceleration to which the container assembly is subjected in one of the three perpendicular directions of the space, and
    a signal processing device configured to convert the first and the second set of signals to obtain force and acceleration data, for each one of the directions of the three perpendicular directions of the space, and also configured to calculate a measure relative to the mass of fuel contained in the variable geometry container.

2. The system according to claim 1, wherein the signal processing device is configured to calculate the mass as the result of dividing a sum of the forces exerted on a direction of the three common directions of the space, by the acceleration to which the container assembly is subjected by the same direction, additionally subtracting the known container assembly empty weight.

3. The system according to claim 1, wherein the signal processing device comprises an analog to digital converter for converting the first and the second set of signals to force and acceleration data.

4. The system according to claim 1, wherein the at least one three-axis load cell comprises four three-axis load cells arranged at opposing extremes of the rigid support.

5. The system according to claim 1, wherein the rigid support is a pallet.

6. The system according to claim 1, wherein the three-axis load cell is a strain gauge load cell and is configured to provide analog voltage signals corresponding to the first set of three signals.

7. The system according to claim 1, wherein the variable geometry container is a portable container, and it is made of a flexible material.

8. The system according to claim 1, further comprising a display system configured to display and monitor the mass of fuel calculated.

9. A method for measuring a mass of fuel contained in a variable geometry container, comprising the steps:
- providing a container assembly formed by a variable geometry container disposed on a rigid support so that a weight of the container rests on the rigid support,
- generating at least a first set of three signals, by means of a three-axis load cell coupled with the rigid support, wherein each one of the three signals has a magnitude proportional to a force exerted by the container assembly in one of three perpendicular directions of a space enclosed by the container,
- generating at least a second set of three signals, by means of a three-axis accelerometer coupled with the rigid support, wherein each one of the three signals has a magnitude proportional to the acceleration to which the container assembly is subjected in one of the directions of the three directions of the space,
- converting the first and the second set of signals into digital data, representative of measured forces and acceleration subjected by the container assembly, for each one of the three directions of the space,
- calculating, for each one of the three directions of the space, a value relative to the mass of fuel contained in the variable geometry container, from the digital data relative to the measured forces and acceleration,
- calculating, a total value relative to the mass of fuel contained in the variable geometry container.

10. The method according to claim 9, wherein the step of calculating the value relative to the mass of fuel contained in the variable geometry container comprises dividing the sum of the measured forces exerted on a direction of the three directions of the space, by the acceleration to which the container assembly is subjected in the same direction.

11. The method according to claim 9, wherein the step of calculating the total value relative to the mass of fuel contained in the variable geometry container comprises the step of determining the global mass of fuel as a result of a function that relates all the calculated values relatives to the mass of fuel contained in the variable geometry container for each of the three directions of the space, and the step of subtracting the known container assembly empty weight from the global mass.

12. The method according to claim 11, wherein the function that relates all the calculated values relatives to the mass of fuel contained in the variable geometry container for each of the three directions of the space, comprises one of an arithmetic mean, or a median, or a weighting function.

13. The method according to claim 9, further comprising the step of displaying and monitoring the total value relative to the mass of fuel contained in the variable geometry container measured with a display system.

* * * * *